United States Patent [19]

Klug et al.

[11] 4,173,153
[45] Nov. 6, 1979

[54] FRICTION DISC TRANSMISSION

[75] Inventors: Alan G. Klug; John H. Marto, both of Oshkosh, Wis.

[73] Assignee: J. I. Case Company, Racine, Wis.

[21] Appl. No.: 797,706

[22] Filed: May 17, 1977

[51] Int. Cl.² .................. F16H 15/10; A01D 69/8
[52] U.S. Cl. ............................ 74/197; 74/194; 56/DIG. 4
[58] Field of Search ............ 74/194, 196, 197, 242.8, 74/242.9, 242.11 C, 242.12; 180/70 R; 56/11.3, DIG. 4

[56] References Cited

U.S. PATENT DOCUMENTS

| | | | |
|---|---|---|---|
| 1,592,952 | 7/1926 | Martin | 74/194 |
| 2,942,487 | 6/1960 | Claus | 74/197 |
| 3,059,397 | 10/1962 | Anderson et al. | 56/DIG. 4 |
| 3,398,807 | 8/1968 | Berger | 74/197 |
| 3,473,622 | 10/1969 | Orr | 74/197 |
| 3,667,304 | 6/1972 | Puffer et al. | 74/196 |

Primary Examiner—Samuel Scott
Assistant Examiner—William R. Henderson
Attorney, Agent, or Firm—Cullen, Sloman, Cantor, Grauer, Scott & Rutherford

[57] ABSTRACT

The disclosed friction disc transmission includes a conventional drive disc rotatable about a vertical shaft and a vertical friction disc engaging the top horizontal face of the drive disc to be driven about a horizontal axis. The friction disc is rotatably supported on a pivot frame having a sprocket drive connected to a sprocket on the wheel axle. The vertical drive disc shaft is mounted on a transversely swingable support for movement of the drive disc relative to the driven friction disc and control of the rotational speed and direction of the driven disc. The support includes a control plate having camming surfaces which lift the driven disc over the center neutral axis of the drive disc, reducing wear of the driven disc when the transmission is in neutral. The control also includes a clutch-brake mechanism independent of the control plate including a lever connected to a rotatable link means. The link means is operably connected to the pivot frame and a brake shoe and is operable upon actuation of the lever to sequentially vertically lift the frame means and the friction disc out of engagement with the drive disc and engage the brake shoe against the friction disc to stop rotational movement of the friction disc.

8 Claims, 5 Drawing Figures

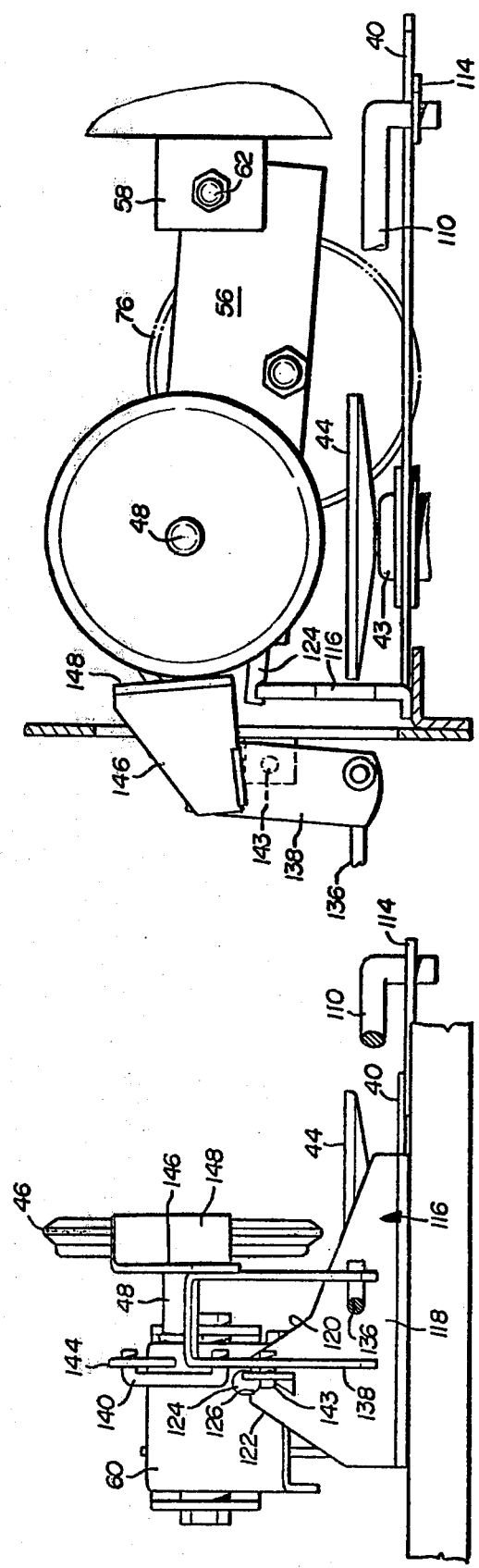

FRICTION DISC TRANSMISSION

FIELD OF THE INVENTION

The present invention relates to variable speed friction disc transmissions having a pair of discs; the friction or driven disc having its periphery engaging the face of the drive disc. Friction disc transmissions of the type disclosed herein are used primarily for propulsion of small land traversing vehicles, particularly power lawn mowers.

A variable speed friction disc transmission of the type disclosed herein is shown in U.S. Pat. No. 2,942,487 of Claus. The transmission disclosed in the Claus Patent includes a driving disc rotatable about a vertical axis and having a flat horizontal face normal to its axis of rotation and a driven disc rotatable on an axis normal to the axis of the driving disc and having its periphery engaging the face of the driving disc. As is known, the speed at which rotation is imparted to the driven disc is a function of the distance between the axis of the driving disc and the zone at which its face is engaged by the periphery of the driven disc. Further, the driven disc rotates in one direction on one side of the rotational axis of the driving disc and in the opposite direction on the opposed side. Thus, the driven disc may be rotated at any desired speed in either direction simply by moving the driven disc across the face of the driving disc.

The friction disc transmission disclosed in the Claus Patent has however several disadvantages. The friction disc transmission disclosed in the Claus Patent does not include a brake, stopping rotation of the driven disc and the driven disc is subject to wear, particularly when the driven disc is located in the center rotational axis of the driving disc. The latter problem has been recognized by the prior art which suggests the use of a neutral "button" as shown in U.S. Pat. No. 1,592,952 and 3,473,622. The prior art has not however made any significant improvement over the variable speed friction disc transmission disclosed in the Claus Patent or solved the problems described above.

The need therefore exists for a simple variable speed friction disc transmission having an improved variable speed control and a braking system. These and other improvements have been made in the variable speed friction disc transmission of the present invention.

SUMMARY OF THE INVENTION

The friction disc transmission of the present invention includes a drive disc rotatably mounted on a generally vertical axis and a driven friction disc rotatable about a horizontal axis normal to the axis of the drive disc and having a periphery engaging the face of the drive disc as disclosed in the above referenced patent of Claus. The friction disc in the preferred embodiment is supported on a pivot frame which is pivotally supported on a horizontal pivot axis spaced from the horizontal rotational axis of the friction disc. In the disclosed embodiment, a drive sprocket is rotatably supported on the pivot frame between the frame pivot and the rotational axis of the friction disc. The drive sprocket is driven by the friction disc and drives an axle sprocket mounted on a horizontal wheel axle for driving the wheel of a gound traversing vehicle.

In the disclosed and preferred embodiment of the friction drive transmission, the drive disc is rotatably supported on a swing arm or plate which is swingable about a vertical axis spaced from the vertical axis of the drive disc. In the disclosed embodiment, the swing axis is coincident with the drive shaft of the motor. The swing arm includes a control guide which has an upwardly facing vertically inclined camming face which engages and lifts the distal end of the pivot frame upon swinging lateral movement of the arm. The friction disc may thus be raised out of contact with the drive disc. In the disclosed embodiment, the control guide includes two opposed laterally spaced vertically inclined, upwardly facing camming surfaces for raising and lowering the friction disc and an intermediate notch for retaining the friction disc in a raised neutral position. The control guide is located relative to the rotational axis of the drive disc to lift the friction disc over the neutral axis of the drive disc, limiting wear of the discs and eliminating the requirement of a neutral "button" as described above.

The preferred embodiment of the friction disc transmission of the present invention also includes a clutch-brake mechanism which sequentially vertically lifts the pivot frame and friction disc out of engagement with the drive disc and stops rotation of the friction disc. The disclosed embodiment includes a foot pedal pivotally mounted on a rock shaft and a link means comprising a control link operably connected to the pedal for pivotal motion upon actuation of the pedal, a clutch link pivotally connected to the pivot frame to lift the pivot frame about its pivot axis and an L-shaped brake shoe connected to the control link and engaging the friction disc upon actuation of the pedal after the friction disc has been lifted out of contact with the drive disc.

The variable speed friction disc transmission of the present invention thus eliminates many of the problems inherent in the transmissions disclosed in the prior art. The friction disc transmission of the present invention includes a unique drive which eliminates the requirement of a gear speed reducer and results in a relatively simple positive drive. Other advantages and meritorious features of the present invention will be more fully understood from the following description of the preferred embodiments, the appended claims and the drawings, a brief description of which follows.

BRIEF DESCRIPTION OF THE DRAWINGS

FIG. 3 is a partial side view of the friction disc transmission shown in FIG. 1 following actuation of the clutch-brake;

FIG. 4 is an end view of the friction disc transmission shown in FIGS. 1 and 2; and FIG. 5 is a schematic view of the chain drive utilized in the friction disc transmission shown in FIGS. 1 and 2 illustrating the self-energizing feature of the disclosed transmission.

DESCRIPTION OF THE PREFERRED EMBODIMENTS

As described above, the friction disc transmission of the present invention was specifically designed for small tractor-like vehicles such as power lawn mowers. It will be understood by those skilled in the art however that the self-energizing transmission of the present invention may be utilized in other applications, particularly the improvements disclosed and claimed herein. The transmission of the present invention will be described in regard to a fourwheeled lawn mower tractor or the like.

Figure 1:
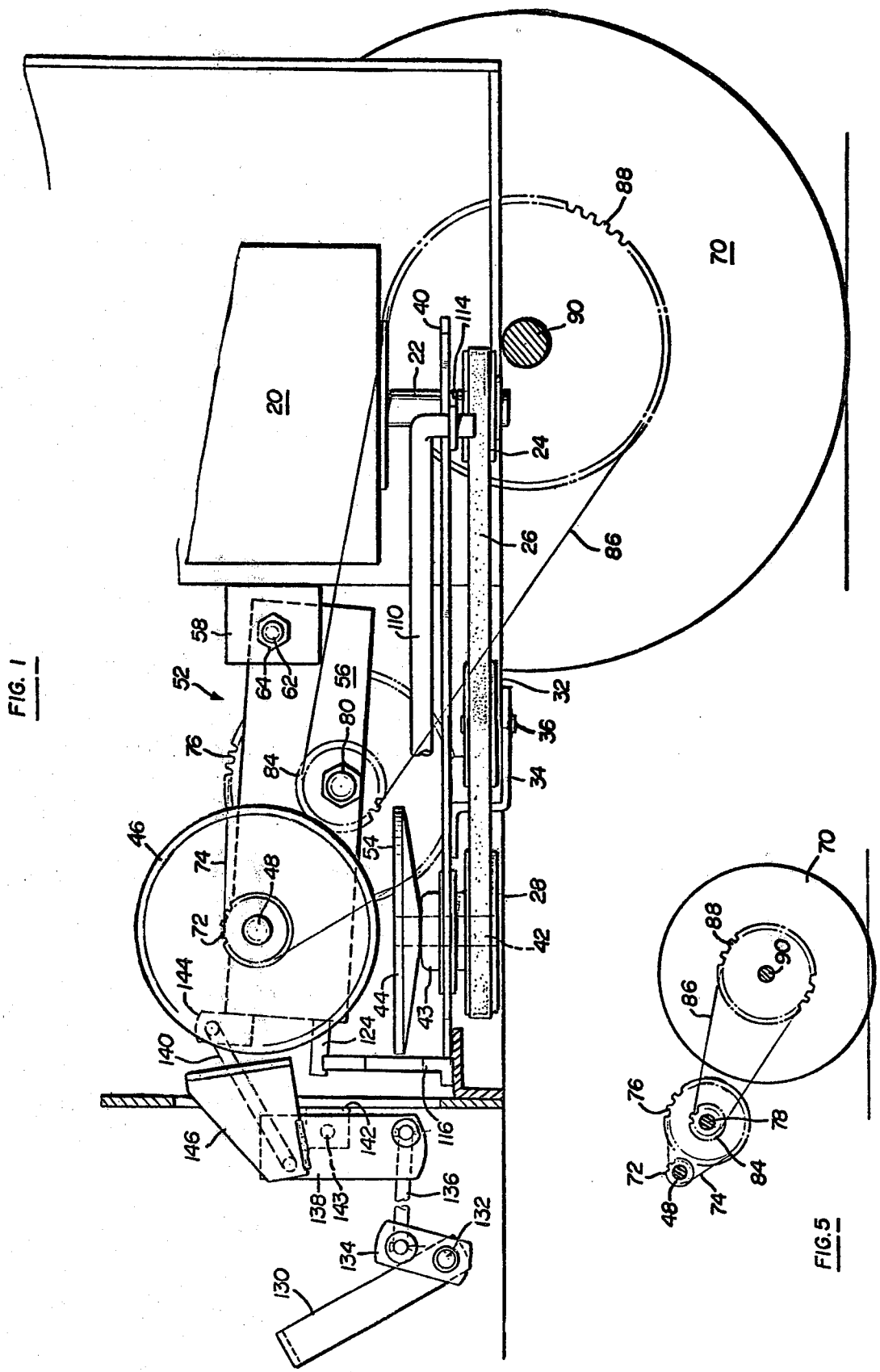
FIG. 1 is a side view of one embodiment of the friction disc transmission of this invention.
Figure 2:
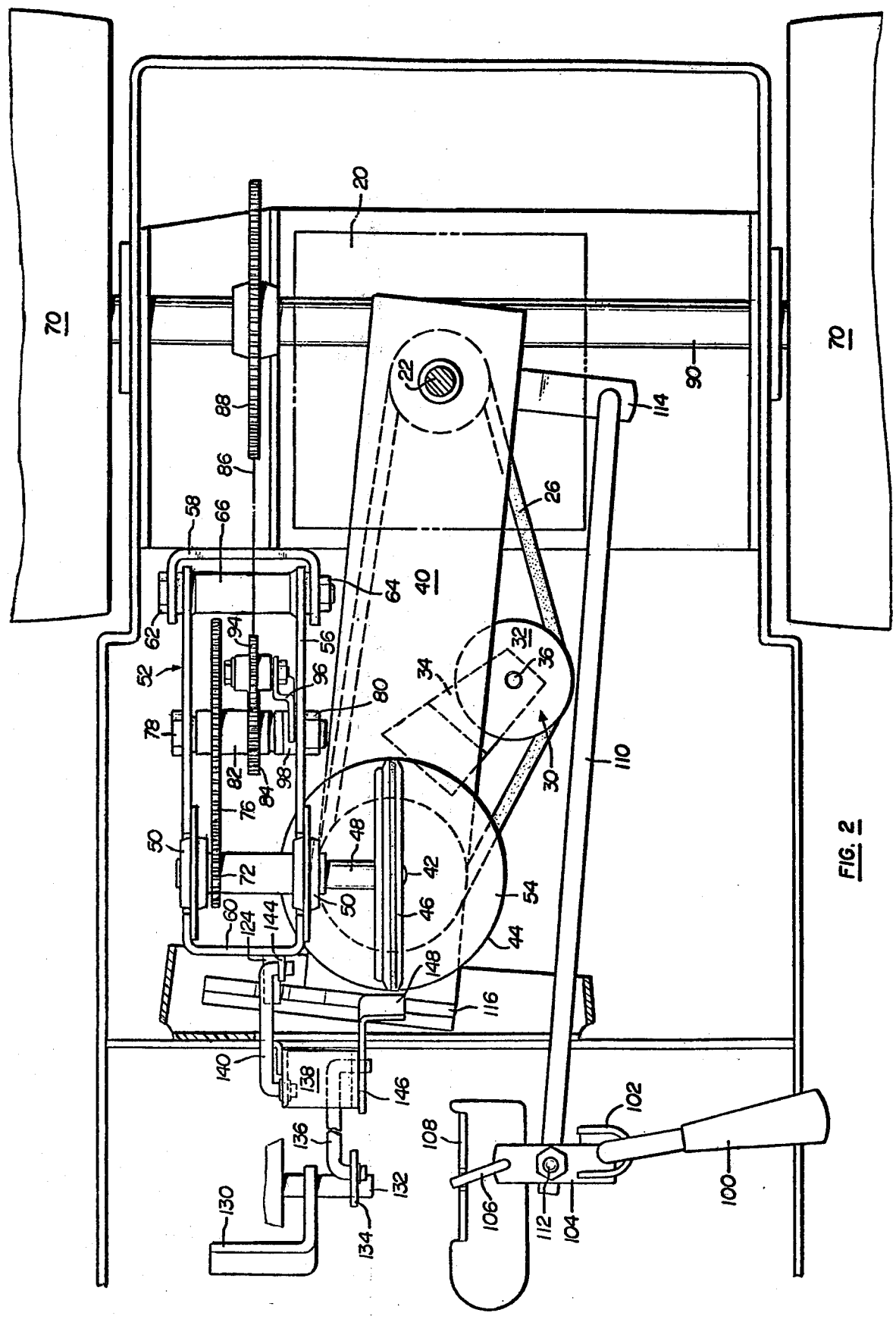
FIG. 2 is a top elevation of the embodiment of the friction disc transmission shown in FIG. 1.

The power source 20 of the friction disc transmission may be a conventional four cycle gasoline motor or the like. The motor is supported with the drive shaft 22 extending vertically downwardly as shown in FIG. 1 and a pulley or hub 24 is secured to the shaft for rotation therewith. A conventional V-belt 26 is received on the hub 24 and the drive pulley 28 of the friction disc transmission. A conventional idler assembly 30 may be provided to maintain tension in the V-belt, particularly during idling of the transmission. The idler assembly includes a V-belt pulley 32, a spring-biased bracket 34 which rotatably supports the pulley 32 on shaft 36 and a conventional coil-spring, not shown. The bracket 34 is pivotally supported on plate or swing-arm 40 and a coil-spring urges the pulley 32 against the V-belt 26 as shown in FIG. 2.

The pulley 28 is rotatably supported on a vertical shaft 42 on bearing assembly 43. The drive or driving disc 44 in the disclosed embodiment of the friction disc transmission is rotatably supported on vertical shaft 42. Thus, motor 20 rotatably drives the drive disc 44 through pulleys 24 and 28 and V-belt 26.

The driven assembly includes the friction or driven disc 46 which is rotatably supported on a horizontal axis comprising shaft 48 and bearings 50. Shaft 48 is supported for rotation on pivot frame or bracket 52. As described above, the rim of the friction disc is received against the flat horizontal face 54 of drive disc 44, rotating the friction disc 46 in one direction on one side of the vertical axis 42 and in the opposite direction on the opposed side. Further, the speed of imparted rotation is dependent upon the distance from the axis 42. The speed being greatest at the periphery of the drive disc and zero or "neutral" at the axis. This form of friction transmission is described in more detail in the above referenced patent of Claus.

The pivot frame 52 includes side plates 56, support end bracket 58, which is welded or otherwise secured to a vertical plate of the tractor housing and an opposed end plate 60. The side plates 56 of the pivot frame are pivotally supported on bracket 58 in a conventional manner such as shown in FIG. 2. In the disclosed embodiment, a bolt 62 is received through the ends of the U-shaped bracket 58 and the side plate 56 and a nut 64 retains the bolt in place. A support and bearing element 66 is received between the side plates and washers may be provided between the side plates and the ends of the bracket 58. The distal end 60 of the bracket is thus free to pivot about the horizontal axis of bolt 62.

Power is transmitted to the rear wheels 70 of the tractor as follows. A hub-sprocket 72 is operably supported on friction disc shaft 48 for rotation with the friction disc. A first drive chain 74 is entrained on hub-sprocket 72 and sprocket 76, driving the larger sprocket. Sprocket 76 is rotatably supported on a second parallel horizontal axis provided by bolt 78 which is received through the side walls 56 of the pivot frame and secured by nut 80. In the disclosed embodiment, the sprocket 76 is secured to a bearing element 82 which rotates a second smaller hub-sprocket 84. A second drive chain 86 is then entrained on hub-sprocket 84 and the wheel axle sprocket 88 secured to the vehicle axle 90. The power of motor 20 is thus transmitted through the friction discs 44 and 46, through drive chains 74 and 86 to the rear axle 90 of the tractor to drive the wheels 70 forward or in reverse dependent upon the position of the friction disc 46 relative to the drive disc 44 as described above. As will be understood by those skilled in the art, the differential in size between hub-sprocket 72 and sprocket 76 and hub-sprocket 84 and sprocket 88 results in a substantial mechanical advantage.

In the disclosed embodiment, a spring-biased idler is provided in the second chain 86 to maintain tension in the chain during idle. As described below, tension is normally maintained in the chain during forward and reverse. The disclosed embodiment of the idler includes an idler-sprocket 94 which is rotatably mounted on an outwardly biased bracket 96. In the disclosed embodiment, the bracket is supported on a separate bearing element 98 on bolt 78.

As described above, the friction or driven disc in the friction disc transmissions disclosed in the prior art are spring biased against the drive or driving disc. The spring force is thus at a minimum when the discs are in contact and the spring force increases as the discs are separated. The preferred embodiment of the friction disc transmission of the present invention is self-energizing, wherein the force urging the friction disc into contact with the drive disc is proportional to the torsional load on the axle, providing maximum pressure during peak loads as when the tractor is moving up hill and minimal contact when the load is light, such as when the tractor is movng down hill. The self-energizing feature of the present invention is best illustrated in FIG. 5. As described above, the horizontal rotational axis 78 of hub-sprocket 84 is supported on pivot frame 52 between pivot axis 62 and axis 48 of friction disc 46. The rotational axis 90 of chain sprocket 88 is located vertically below the axis 78 of sprocket 84. The tension in chain 86 is thus transmitted to shaft 78, urging the friction disc 46 into frictional contact with drive disc 44. Further, the greater the tension the greater the downward force. Thus, when the tractor is under greatest load, as when the tractor is moving up hill, the force urging the friction disc into contact with the drive disc is greatest. As shown in FIG. 5, the upper run of the chain 86 is under tension when the vehicle is moving forwardly and the lower run of the chain is under tension when the vehicle is moving rearwardly. In either event, the axis 78 is urged downwardly, forcing the friction disc into contact with the drive disc.

The control of the disclosed embodiment of the friction disc transmission may be utilized to vary the speed of rotation of the friction disc and thus the wheels, set the friction disc in neutral or idle and brake rotation of the friction disc. The disclosed embodiment includes two sets of controls. The first to be described is the speed control.

As shown in FIG. 2, the speed control is operated by an operator lever or handle 100 which may be positioned adjacent the steering column of the tractor, not shown. The shaft of the control handle is supported in a support bracket 102 which permits forward and rearward motion of the handle. The handle is connected to one end of link 104 and an L-shaped latch pin 106 is disposed through the opposed end. The latch pin is received on the upper edge of the L-shaped control bracket 108 as described herein below. The center of link 104 is secured to control rod 110 by a bolt 112 or other means of securement. The opposed end of the control rod 110 is pivotally secured to swing arm extension or bracket 114.

The control rod 110 may be pivotally supported at its base, not shown, such that forward motion of the handle rotates extension 114 and swing plate 40 in a clockwise direction about the axis of drive shaft 22. In effect, the friction disc 46 is thus moved toward the periphery of the drive disc, toward the bottom of FIG. 2. The forward speed of the tractor is thus increased as the control lever or handle 100 is moved forwardly. Conversely, the speed of the tractor is reduced as the friction disc approaches the center or neutral axis of the drive disc. When the handle is moved sufficiently rearwardly for the friction disc to contact the opposed side of the drive disc, the upper portion in FIG. 2, the tractor mower is driven rearwardly at increasing speeds. The bracket 108 in the disclosed embodiment includes an upwardly extending portion which may include a series of notches for receipt of the latch pin 106, retaining the control rod 110 in the set position.

The preferred speed control also includes a unique control plate 116 which lifts the friction disc over the center neutral axis, eliminating wear in the neutral or idle position. The control plate is generally L-shaped having an upwardly extending portion 118 having a configured face. In the disclosed embodiment, the upper face includes opposed vertically inclined faces 120 and 122 which receives the extension 124 of the pivot frame 52 to lift the pivot frame about pivot axis 62 and friction disc 46 out of contact with the drive disc 44. A notch 126 may be provided adjacent the mid-portion of the control plate to retain the friction disc in the neutral position as shown in FIGS. 1 and 3. A line drawn along the swing plate 40 through the vertical axis of drive shaft 22 and vertical axis of shaft 42 is generally perpendicular to the control plate 116.

As described above, one important source of wear of the friction disc results from the friction disc contacting the drive disc at the center or neutral axis. As will be understood, a lawn tractor or the like is often set at idle, resulting in flat portions being ground on the friction disc. This problem has been solved in the friction disc transmission of the present invention by providing the configured control plate 116 which simply raises the friction disc when the friction disc is over the center or neutral axis of the drive disc.

As described above, the control of the friction disc transmission of the present invention also includes a clutch-brake. The clutch-brake includes an L-shaped foot pedal 130 which is mounted on a rock shaft 132. The rock shaft 132 is mounted for rotational movement (not shown) to the power lawn mower body as is conventional. Follower link 134 is connected at one end to rock shaft 132 for rotation with foot pedal 130. A C-shaped link 136 is pivotally connected at one end to follower link 134 and a U-shaped bracket 138 at the opposed end. Conventional Cotter pins retain the C-shaped link as shown in FIG. 1. The U-shaped link is pivotally supported by a bracket 142 having a pivot axis or pin 143. The control bracket is thus rotated in a clockwise direction about pivot axis 143 when the foot pedal 130 is depressed.

As best shown in FIG. 2, a C-shaped link is pivotally connected at one end to the control bracket and the link extends upwardly to be connected at the opposed end to an extension 144 of the pivot frame 52. Clockwise rotation of the control bracket 138 thus lifts the distal end of the pivot frame 52 to lift the friction disc out of contact with the drive disc. The control bracket 138 also includes an L-shaped brake shoe 146 welded or otherwise secured to the side of the control link. Further depression of the pedal 130 brings the end 148 of the control link into contact with the periphery of the friction disc, braking the friction disc. In the preferred embodiment, the clutching and braking operations are performed sequentially. That is, link 140 first lifts the friction disc from the drive disc. Then, face 148 of the brake shoe contacts the periphery of the friction disc, braking rotational motion of the friction disc. It will be understood that the clutching function may also be performed separately, wherein the clutch-brake pedal is partially depressed, releasing the drive mechanism and putting the transmission in neutral.

The control mechanisms of the friction disc transmission have therefore different functions. Control handle 100 may be utilized to increase and decrease the speed of the lawn tractor, shift gears and place the tractor in neutral. The clutch-brake pedal 130 may be utilized to clutch the transmission at any speed without returning the drive disc to neutral or for braking the tractor.

As described above, the transmission is shown in neutral in FIGS. 1 to 3. The control plate 40 has been rotated by control handle 100 to lift the friction disc. As shown in FIG. 2, the friction disc is located over the center neutral axis of the drive disc 54. In FIG. 3, the clutch-brake pedal 130 has been fully depressed, bringing the brake shoe 146 into contact with the friction disc, stopping the disc.

It will be understood that various details of the friction disc transmission of the present invention have not been disclosed as such details are considered conventional. Further, conventional materials may be utilized for the elements of the transmission. For example, many of the elements may be formed from sheet or rod steel. The drive and friction discs may be formed from synthetic rubber or various plastic materials preferably having a friction grit or filler material. It will also be understood that the various improvements utilized in the friction disc transmission of the present invention may be utilized separately. For example, the clutch-brake mechanism or the control plate may be utilized in the friction disc transmission disclosed in the Claus Patent. Alternatively, the unique self-energizing feature may be used with a conventional control. Having described the self-energizing friction disc transmission of the present invention, we make the following claims.

We claim:

1. A friction disc transmission, comprising: a drive disc rotatably supported on a generally vertical shaft, power means rotating said drive disc, a driven friction disc rotatably supported above said drive disc on a horizontal shaft, said horizontal shaft supported on a frame means yieldably biasing said friction disc against said drive disc, said vertical drive disc shaft mounted on a laterally swingable support, said support swingable about a vertical axis generally parallel to and spaced from said vertical drive disc shaft, a control guide on said support having an upwardly facing vertically inclined camming face extending generally tangent to an arc drawn about said vertical support axis and a guide on the distal end of said frame means engaging said camming face upon lateral swinging movement of said support vertically lifting said frame means and said friction disc out of engagement with said drive disc.

2. The friction disc transmission defined in claim 1, characterized in that said control guide is located on one end of said support, a line drawn along said support through said support swinging axis and the vertical axis of said drive disc is generally perpendicular to said control guide.

3. The friction disc transmission defined in claim 2, characterized in that said control guide includes opposed laterally spaced vertically inclined, upwardly facing camming surfaces raising and lowering said frame means and said friction disc and said control guide having an intermediate notch for retaining said frame means in a raised neutral position.

4. The friction disc transmission defined in claim 1, characterized in that said transmission includes a clutch-brake mechanism, comprising a lever connected to a rotatable link means, said link means operably connected to said frame and a brake shoe, said link means operable upon actuation of said lever to sequentially (a) vertically lift said frame means and said friction disc out of engagement with said drive disc, and (b) engaging said brake shoe against said friction disc to stop rotational movement of said friction disc.

5. The friction disc transmission defined in claim 4, characterized in that said lever comprises a foot pedal pivotally mounted on a rock shaft, said link means comprising a control bracket operably connected to said pedal for pivotal motion upon actuation of said pedal, a link pivotally connected at opposed ends to said control bracket and said frame to lift said frame about its pivotal axis upon actuation of said pedal and an L-shaped brake shoe connected to said control bracket extending towards said friction disc to engage said friction disc upon actuation of said pedal after said friction disc has been lifted out of contact with said drive disc.

6. A friction disc transmission, comprising: a drive disc rotatably mounted on a generally vertical shaft supported on a swing arm, said swing arm supported for a lateral swinging motion about a vertical shaft, a driven friction disc rotatably supported on a horizontal shaft mounted on a frame means and rotatable about a horizontal axis located above said drive disc, said frame means supported on a horizontal pivot spaced from said horizontal rotational axis of said friction disc, a control guide on said support having an upwardly facing vertically inclined camming face and a guide support on the distal end of said frame means opposite said pivot engaging said camming face upon swinging lateral movement of said support to vertically lift said frame and said friction disc out of engagement with said drive disc.

7. The friction disc transmission defined in claim 6, characterized in that said control guide includes opposed laterally spaced vertically inclined, upwardly facing camming surfaces raising and lowering said friction disc and an intermediate notch receiving said guide support and retaining said friction disc at a raised neutral position.

8. A friction disc transmission, comprising: a drive disc rotatably mounted on a generally vertical shaft, a driven friction disc supported on a frame means rotatable about a horizontal axis rotated above said drive disc, said frame means supported on a horizontal pivot axis spaced from said horizontal rotational axis of said friction disc, drive means rotating said drive disc and a clutch-brake mechanism raising said frame means and stopping rotation of said friction disc including a lever connected to a rotatable link means, said lever pivotally mounted on a rock shaft, said link means comprising a generally U-shaped control bracket operably connected to said lever for pivotal motion upon actuation of said lever, a link pivotally connected at opposed ends to one portion of said generally U-shaped control bracket and said frame means to lift said frame means about its pivotal axis upon actuation of said lever and a brake shoe connected to another portion of said generally U-shaped control bracket extending toward said friction disc to engage said friction disc, said control bracket pivotable upon actuation of said lever to pivot said link connected between said control bracket and said frame means and vertically lift said frame and said friction disc out of engagement with said drive disc, and after said frame means is lifted out of engagement with the drive disc, further actuation of said lever causing said control bracket to pivot and engage said brake shoe against said friction disc to stop rotational movement of said friction disc.

* * * * *